United States Patent [19]

Bertram et al.

[11] Patent Number: 5,169,473

[45] Date of Patent: Dec. 8, 1992

[54] LATENT CATALYSTS, EPOXY COMPOSITIONS INCORPORATING SAME, AND COATING, IMPREGNATING AND BONDING METHODS EMPLOYING THE COMPOSITIONS

[75] Inventors: James L. Bertram, Lake Jackson; Louis L. Walker, Clute, both of Tex.; Charlie Z. Hotz, Walnut Creek, Calif.

[73] Assignee: The Dow Chemical Company, Midland, Mich.

[21] Appl. No.: 526,488

[22] Filed: May 21, 1990

[51] Int. Cl.⁵ .................................. C09J 5/02
[52] U.S. Cl. .......................... 156/307.4; 156/330; 427/386; 502/150; 502/167; 525/523; 528/91; 528/93
[58] Field of Search ............. 156/330, 307.4; 528/93, 528/91; 525/523; 427/386; 502/167, 150

[56] References Cited

U.S. PATENT DOCUMENTS

| | | |
|---|---|---|
| 3,136,736 | 6/1964 | Washburne et al. . |
| 3,738,862 | 6/1973 | Klarquist et al. ................. 427/386 |
| 3,884,856 | 5/1975 | Motier et al. . |
| 3,947,395 | 3/1976 | Ogata et al. . |
| 4,438,254 | 3/1984 | Doorakian et al. . |
| 4,692,504 | 9/1987 | Frank . |
| 4,725,652 | 2/1988 | Bertram et al. .................... 528/93 |
| 4,775,734 | 10/1988 | Goel . |
| 4,906,677 | 3/1990 | Barsotti et al. . |
| 4,908,397 | 3/1990 | Barsotti et al. . |
| 4,925,901 | 5/1990 | Bertram et al. .................... 528/93 |
| 4,975,474 | 12/1990 | Barsotti et al. . |

FOREIGN PATENT DOCUMENTS

| | | | |
|---|---|---|---|
| 236117 | 2/1960 | Australia ........................... 528/91 |
| 600187 | 6/1960 | Canada ............................. 528/91 |
| 58-138729 | 8/1983 | Japan . |
| 915704 | 1/1963 | United Kingdom .............. 528/91 |
| 963058 | 7/1964 | United Kingdom . |

OTHER PUBLICATIONS

"Proposed Mechanism for the Curing of Epoxy Resins with Amine-Lewis Acid Complexes or Salts" by James J. Harris and Samuel C. Temin, *J. Ap. Pol. Sc.*, vol. 10, pp. 523-534 (1966).

*Primary Examiner*—John J. Gallagher

[57] ABSTRACT

Products resulting from contacting (1) at least one compound selected from the group consisting of (a) at least one onium compound of the element nitrogen, phosphorus, sulfur or arsenic; (b) at least one amine compound; and (c) a mixture of any two or more of the (a) and (b) components; with (2) either (a) boric acid or (b) a mixture of boric acid and at least one acid having a weak nucleophilic anion are suitable catalysts for reacting vicinal epoxy-containing compounds with aromatic hydroxyl-containing compounds.

38 Claims, No Drawings

LATENT CATALYSTS, EPOXY COMPOSITIONS INCORPORATING SAME, AND COATING, IMPREGNATING AND BONDING METHODS EMPLOYING THE COMPOSITIONS

FIELD OF THE INVENTION

The present invention concerns latent, curable, catalyzed mixtures of epoxy-containing compounds and aromatic hydroxyl-containing compounds. The present invention also concerns latent catalysts and epoxy resin compositions containing them.

BACKGROUND OF THE INVENTION

Epoxy resins have been precatalyzed with phosphonium and other compounds to provide latent compositions which form advanced, higher molecular weight epoxy resins when admixed with an aromatic hydroxyl-containing compound as disclosed by Perry in U.S. Pat. No. 3,948,855 and Can. 893,191; by Dante et al. in U.S. Pat. No. 3,477,990; by Mueller et al. in U.S. Pat. No. 3,547,881; by Tyler, Jr. et al. in U.S. Pat. No. 4,366,295; and by Cragar in Can. 858,648.

While compositions containing these catalysts and an epoxy resin are somewhat stable, such compositions which also contain an aromatic hydroxy-containing compound are lacking in stability.

Curable compositions containing epoxy resins and aromatic hydroxyl-containing compounds and a catalyst therefor would be highly desirable in the preparation of storage stable coatings, storage stable electrical encapsulants, storage stable formulations for preparing mechanical and electrical laminates and composites, storage stable one package molding compositions, storage stable curable compositions for use in resin transfer molding (RTM) and reaction injection molding (RIM) applications and the like.

Copending applications Ser. No. 07/274,250 filed Nov. 18, 1988, Ser. No. 07/274,227 filed Nov. 18, 1988 and Ser. No. 07/274,264 filed Nov. 18, 1988 disclose catalysts which render a mixture of an epoxy resin and an aromatic hydroxyl-containing compound storage stable; however, these catalysts which are formed by contacting an imidazole compound or an onium compound or an adduct of an amine and an acid having a strong nucleophilic anion with an acid having a weak nucleophilic anion such as fluoboric acid result in compositions having a relatively long induction time at elevated curing temperatures.

It would be desirable to have available catalysts which render compositions containing epoxy resins and compounds containing phenolic hydroxyl groups storage stable at storage temperatures and which also result in curable compositions having reduced induction time at elevated curing temperatures.

SUMMARY OF THE INVENTION

The present invention pertains to the catalytic product resulting from contacting (1) at least one compound selected from the group consisting of (a) at least one onium compound of the element nitrogen, phosphorus, sulfur or arsenic; (b) at least one amine compound; and (c) a mixture of any two or more of the (a) and (b) components; with (2) boric acid; or with (3) a mixture of (a) boric acid and (b) at least one acid having a weak nucleophilic anion.

Another aspect of the present invention pertains to a mixture comprising (A) at least one compound containing an average of more than about 1 vicinal epoxy group per molecule; and (B) the catalytic product resulting from contacting (1) at least one compound selected from the group consisting of (a) at least one onium compound of the element nitrogen, phosphorus, sulfur or arsenic; (b) at least one amine compound; and (c) a mixture of any two or more of the (a) and (b) components; with (2) boric acid; or with (3) a mixture of (a) boric acid and (b) at least one acid having a weak nucleophilic anion.

A further aspect of the present invention pertains to a mixture comprising (A) at least one compound containing an average of more than about 1 vicinal epoxy group per molecule; (B) at least one compound containing an average of more than about 1 aromatic hydroxyl group per molecule; and (C) the catalytic product resulting from contacting (1) at least one compound selected from the consisting of (a) at least one onium compound of the element nitrogen, phosphorus, sulfur or arsenic; (b) at least one amine compound; and (c) a mixture of any two or more of the (a) and (b) components; with (2) boric acid; or with (3) a mixture of (a) boric acid and (b) at least one acid having a weak nucleophilic anion.

A further aspect of the present invention pertains to a process for coating articles which process comprises (I) applying to the surface of a suitable article, a mixture comprising (A) at least one compound containing an average of more than about 1 vicinal epoxy group per molecule; (B) at least one compound containing an average of more than about 1 aromatic hydroxyl group per molecule; (C) the catalytic product resulting from contacting (1) at least one compound selected from the group consisting of (a) at least one onium compound of the element nitrogen, phosphorus, sulfur or arsenic; (b) at least one amine compound; and (c) a mixture of any two or more of the (a) and (b) components; with (2) boric acid; or with (3) a mixture of (a) boric acid and (b) at least one acid having a weak nucleophilic anion; and (D) optionally one or more solvents; and (II) curing the thus coated article at a suitable temperature to cause the applied mixture to cure.

Another aspect of the present invention pertains to a process for preparing "B-staged" reinforcing substrate materials which process comprises (I) saturating said reinforcing substrate with a curable mixture comprising (A) at least one compound containing an average of more than about 1 vicinal epoxy group per molecule; (B) at least one compound containing an average of more than about 1 aromatic hydroxyl group per molecule; (C) the catalytic product resulting from contacting (1) at least one compound selected from the group consisting of (a) at least one onium compound of the element nitrogen, phosphorus, sulfur or arsenic; (b) at least one amine compound; and (c) a mixture of any two or more of the (a) and (b) components; with (2) boric acid; or with (3) a mixture of (a) boric acid and (b) at least one acid having a weak nucleophilic anion; and (D) optionally one or more solvents; (II) optionally removing excess solution from the thus treated reinforcing substrate material by any suitable means; (III) subjecting the thus treated reinforcing substrate material to a temperature which removes any solvent material which may be present in the mixture applied to said reinforcing substrate material; and (IV) heating the product from step (III) so as to partially cure the thus applied curable mixture thereby forming a "B-staged" reinforcing substrate material.

Another aspect of the present invention pertains to a process for the preparation of laminates or composites which process comprises (I) cutting the aforementioned "B-staged" reinforcing substrate material to a desired size and shape; (II) assembling two or more of the resultant cut material together, optionally with either or both of the outside layers or any of the intermediate layers being a material different from said "B-staged" reinforcing substrate material; and (III) placing the assembled material in a device for applying heat and pressure so as to cure the "B-staged" reinforcing material.

DETAILED DESCRIPTION OF THE INVENTION

Boric acid as used herein refers to boric acid or derivatives thereof, including metaboric acid and boric anhydride. It is believed that boric acid and its derivatives are all capable of functioning as an inhibitor when added to the compositions of the invention either in the form added or in a converted form.

The catalytic products of the present invention are prepared by simply mixing the components together in the desired proportions and stirring to insure intimate contact. The contact can be conducted at temperatures of from about 0° C. to about 100° C., preferably from about 20° C. to about 60° C. for a time sufficient to complete (any reaction which occurs.) The time depends upon the temperature, but usually from about 1 to about 120, preferably from about 5 to about 60 minutes is sufficient.

Alternately, the catalytic products of the present invention can be prepared in situ in the presence of the epoxy resin by adding each component to the epoxy resin in any order under essentially the same conditions as mentioned above.

(The components from which the catalytic products are prepared are mixed in proportions which provide from about 0.6 to about 1.4, usually from about 0.75 to about 1.35, moles of boric acid or mixture of boric acid and acid having a weak nucleophilic anion per mole of onium, amine or heterocyclic nitrogen-containing compound.) The preferred ratios depend upon which onium or amine compound is mixed with the boric acid or the particular mixture of boric acid and acid having a weak nucleophilic anion. For example, the preferred ratio of moles of boric acid or mixture of boric acid and acid having a weak nucleophilic anion per mole of imidazole compound is from about 0.85:1 to about 1.12:1 while the most preferred ratio is in the range of from about 0.93:1 to about 1.1:1. For phosphonium compounds, the preferred ratio is from about 0.95:1 to about 1.35:1, more preferably from about 1.1:1 to about 1.25:1 moles of acid per mole of phosphonium compound. For other catalysts, it is easy to determine the optimum ratios of boric acid to onium or amine compound by mixing the components together in various ratios and conducting simple, routine experiments such as those described in examples 1-12. When the amount of boric acid or mixture of boric acid and acid having a weak nucleophilic anion is less than about 0.6 mole per mole of imidazole the catalyst is less latent and begins to approach the reactivity of the original imidazole prior to reaction with the acid or acid salt. When the amount of boric acid or mixture of boric acid and acid having a weak nucleophilic anion is more than about 1.4 moles per mole of phosphonium, the catalyst becomes less latent. When the amount of acid or acid salt is more than about 1.14 moles per mole of imidazole, the catalyst becomes less latent.

When a mixture of boric acid and an acid having a weak nucleophilic anion are employed, they are employed in an amount which provides a ratio of moles of boric acid to moles of acid having a weak nucleophilic anion of from about 0.1:1 to about 0.9:1, preferably from about 0.2:1 to about 0.8:1, more preferably from about 0.3:1 to about 0.7:1.

The catalytic product is employed in amounts sufficient to catalyze the reaction between the compound(s) containing an average of more than about one vicinal epoxy group per molecule and the compound(s) containing an average of more than about one aromatic hydroxyl group per molecule when the catalyzed mixture is heated to a temperature of at least about 75° C. In most instances, the quantity of catalyst is from about 0.05 to about 100, suitably from about 0.1 to about 50, more suitably from about 0.5 to about 20, most suitably from about 1 to about 10 millimoles of catalyst per epoxide equivalent.

The catalytic products of the present invention can be employed alone or in combination with other catalysts, preferably catalytic products resulting from reacting the onium or amine compounds or a combination thereof with an inorganic acid containing a weak nucleophile. By the term "weak nucleophile" or "weak nucleophilic", it is meant that the material has a nucleophilicity value "n" of greater than zero and less than about 2.5 as described by C. G. Swain and C. B. Scott in J. Am. Chem. Society, Vol. 75, p 141 (1953) which is incorporated herein by reference.

Particularly suitable inorganic acids having a weak nucleophilic anion or weak nucleophile include, for example, fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid and any combination thereof and the like. Most particularly suitable such acid is fluoboric acid.

Fluoboric acid is sometimes referred to as fluoroboric acid or hydrogen tetrafluoroborate. Any of these expressions refer to the chemical represented by the formula, HBF$_4$.

These catalysts can be prepared by the procedure described in allowed application Ser. No. 07/274,250 filed Nov. 18, 1988 which is incorporated herein by reference in its entirety.

Suitable onium compounds which can be employed herein include, ammonium, phosphonium, sulfonium, arsonium and the like compounds. Particularly suitable such compounds include, those represented by the following formulas IA or IB

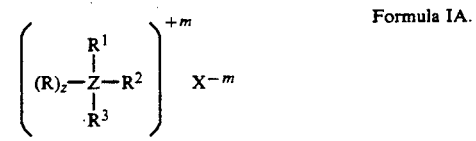

Formula IA.

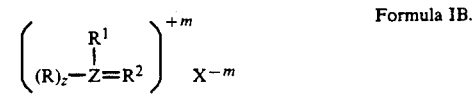

Formula IB.

wherein each R, $R^1$, $R^2$ and $R^3$ is independently a hydrocarbyl group having from 1 to about 18, preferably from about 1 to about 9, carbon atoms, or a hydrocarbyl group having from 1 to about 18, preferably from 1 to about 9 carbon atoms which group also contains one or more oxygen, sulfur, halogen, or nitrogen atoms or two of such R, $R^1$, $R^2$ and $R^3$ groups can combine to form a heterocyclic ring containing one or more atoms other than carbon atoms; each X is the anion portion of an acid of a relatively strong nucleophilic acid; Z is phosphorus, nitrogen, sulfur or arsenic; m has a value equal to the valence of the anion X; and z has a value of zero or 1 depending on the valence of Z.

Particularly suitable onium or amine compounds which can be contacted (reacted or complexed) with the boric acid or mixture of boric acid and acid having a weak nucleophilic anion to form the catalyic products of the present invention include, for example, ethyltriphenyl phosphonium acetate, ethyltriphenyl phosphonium acetate.acetic acid complex, tetrabutyl phosphonium acetate, tetrabutyl phosphonium acetate.acetic acid complex, ethyltriphenyl phosphonium chloride, ethyl triphenyl phosphonium iodide, tetrabutyl phosphonium chloride, tetrabutyl phosphonium iodide, tetrabutylphosphonium hydroxide, tetrabutylammonium hydroxide, tetraethylammonium hydroxide, tetramethylammonium hydroxide, N-methylmorpholine, 2-methylimidazole, triethylamine, N,N,N',N'-tetramethylethylenediamine, ethyltri(2-hydroxyethyl)ammonium hydroxide, ethyltri(2-ethoxyethyl)ammonium hydroxide, triethyl(2-thioethylethyl)ammonium hydroxide, N-methyl-N-methylenemethanaminium acetate, N-methyl-N-methylenemethanaminium acetate.acetic acid complex, N-methyl-N-methylenemethanaminium chloride, N-methyl-N-methylenemethanaminium iodide, N-methylpyridinium acetate, N-methylpyridinium acetate.acetic acid complex, N-methylpyridinium chloride, N-methylpyridinium iodide, 1-ethyl-2,3-dimethylimidazolium acetate, 1-ethyl-2,3-dimethyl-imidazolium acetate.acetic acid complex, 1-ethyl-2,3-dimethylimidazolium chloride, 1-ethyl-2,3-dimethyl-imidazolium iodide, N-methylquinolinium acetate, N-methylquinolinium acetate.acetic acid complex, N-methylquinolinium chloride, N-methylquinolinium iodide, N-methyl-1,3,5-triazinium acetate, N-methyl-1,3,5-triazinium acetate.acetic acid complex, N-methyl-1,3,5-triazinium chloride, N-methyl-1,3,5-triazinium iodide, any combination thereof and the like.

The amine compounds which can be suitably employed herein include, for example, primary, secondary, tertiary, aliphatic, cycloaliphatic, aromatic or heterocyclic amines.

Suitable non-heterocyclic amines which can be employed herein include, those containing suitably from 1 to about 60, more suitably from about 2 to about 27, most suitably from about 2 to about 18, carbon atoms. Particularly suitable such amines include, for example, ethylamine, diethylamine, triethylamine, n-propylamine, di-n-propylamine, tri-n-propylamine, isopropylamine, diisopropylamine, triisopropylamine, butylamine, dibutylamine, tributylamine, methyldibutylamine, combinations thereof and the like.

Suitable heterocyclic secondary and tertiary amines or nitrogen-containing compounds which can be employed herein include, for example, imidazoles, imidazolidines, imidazolines, oxazoles, pyrroles, thiazoles, pyridines, pyrazines, morpholines, pyridazines, pyrimidines, pyrrolidines, pyrazoles, quinoxalines, quinazolines, phthalozines, quinolines, purines, indazoles, indoles, indolazines, phenazines, phenarsazines, phenothiazines, pyrrolines, indolines, piperidines, piperazines, combinations thereof and the like.

Also suitable are the adducts of any aliphatic, cycloaliphatic, aromatic or heterocyclic secondary amine compounds and an epoxy resin having an average of more than one vicinal epoxide group per molecule, such as, for example, an adduct of 2-methylimidazole and the diglycidyl ether of bisphenol A. These adducts can easily be prepared by reacting the secondary amine compound with the epoxy resin at a temperature of from about 25° C. to about 150° C., preferably from about 60° C. to about 125° C., more preferably from about 80° C. to about 100° C. The secondary amine compound and the epoxy resin are employed in amounts of from which provide a ratio of moles of secondary amine compound per epoxide group of from about 1:1 to about 5:1, preferably from about 1:1 to about 3:1, more preferably from about 1:1 to about 1.5:1. The adducts can be prepared in the presence of any suitable solvent such as, for example, alcohols, ethers, glycol ethers, ketones and the like.

Suitable imidazole compounds which can be employed herein include, for example, those represented by the following formula II

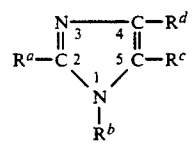

Formula II.

wherein each $R^a$, $R^b$, $R^c$, and $R^d$ is independently hydrogen, halogen, cyano or a hydrocarbyl group having suitably from 1 to about 18, more suitably from 1 to about 9, carbon atoms or such hydrocarbyl groups containing an oxygen, sulfur or halogen or the like substituent, or $R^b$ and $R^c$ can combine to form a 5 or 6 membered ring with the carbon and nitrogen atoms from the imidazole ring to which they are attached or $R^c$ and $R^d$ can combine to form a 5 or 6 membered ring with the two carbon atoms from the imidazole ring to which they are attached. Particularly suitable imidazole compounds include, for example, 2-methylimidazole, 2-ethylimidazole, 2-propylimidazole, 2-butylimidazole, 2-pentylimidazole, 2-hexylimidazole, 2-cyclohexylimidazole, 2-phenylimidazole, 2-nonylimidazole, 2-undecylimidazole, 2-heptadecylimidazole, 2-ethyl-4-methylimidazole, 2-phenyl-4-methylimidazole, 1-benzylimidazole, 1-ethyl-2-methylbenzimidazole, 2-methyl-5,6-benzimidazole, 1-vinylimidazole, 1-allyl-2-methylimidazole, 2-cyanoimidazole, 2-chloroimidazole, 2-bromoimidazole, combinations thereof and the like. Suitable imidazoles wherein one or more of the $R^a$, $R^b$, $R^c$, or $R^d$ group contain oxygen, sulfur or halogen or the like substituents include, for example, 1-(2-hydroxypropyl)-2-methylimidazole, 2-phenyl-4,5-dimethylolimidazole, 2-phenyl-4-methyl-5-hydroxymethylimidazole, 2-chloromethylbenzimidazole, 2-hydroxybenzimidazole, any combination thereof and the like. Most particularly suitable are 2-methylimidazole, 2-ethyl-4-methylimidazole, 1,2-dimethylimidazole and 2-phenylimidazole.

Suitable pyrazole compounds which can be employed herein include, for example, those represented by the following formula III

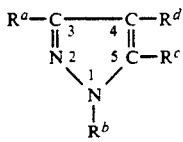

Formula III.

wherein each $R^a$, $R^b$, $R^c$, and $R^d$ is independently hydrogen, halogen, cyano or a hydrocarbyl group having suitably from 1 to about 18, more suitably from 1 to about 9, carbon atoms or such hydrocarbyl groups containing an oxygen, sulfur, cyano or halogen or the like substituent, or $R^b$ and $R^c$ can combine to form a 5 or 6 membered ring with the carbon and nitrogen atoms from the imidazole ring to which they are attached or $R^c$ and $R^d$ can combine to form a 5 or 6 membered ring with the two carbon atoms from the pyrazole ring to which they are attached. Particularly suitable pyrazole compounds include, for example, pyrazole, 1-methylpyrazole, 3-methylpyrazole, 4-butylpyrazole, 1-methyl-3-propylpyrazole, 3-ethyl-5-methylpyrazole, 1-(3-hydroxypropyl)pyrazole, 5-phenylpyrazole, 5-benzylpyrazole, 1-phenyl-3-methylpyrazole, 1-cyanopyrazole, 3-chloropyrazole, 4-bromo-1-methylpyrazole, any combination thereof and the like.

Suitable oxazole compounds which can be employed herein include, for example, those represented by the following formula IV

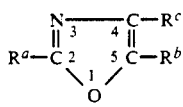

Formula IV.

wherein each $R^a$, $R^b$, and $R^c$ is independently hydrogen, halogen, cyano or a hydrocarbyl group having suitably from 1 to about 18, more suitably from 1 to about 9, carbon atoms or such hydrocarbyl groups containing an oxygen, sulfur, cyano or halogen or the like substituent. Particularly suitable oxazole compounds include, for example, oxazole, 4-methyloxazole, 2-methyloxazole, 4-butyloxazole, 2-methyl-5-propyloxazole, 2-ethyl-4-methyloxazole, 2-(3-hydroxypropyl)oxazole, 4-phenyloxazole, 5-benzyloxazole, 2-phenyl-5-methyloxazole, 2-cyanooxazole, 4-chlorooxazole, 4-bromo-2--methyloxazole, any combination thereof and the like.

Suitable imidazolidine compounds which can be employed herein include, for example, those represented by the following formula V

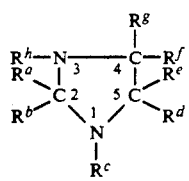

Formula V.

wherein each $R^a$, $R^b$, $R^c$, $R^d$, $R^e$, $R^f$, $R^g$, and $R^h$ is independently hydrogen, halogen, cyano or a hydrocarbyl group having suitable from 1 to about 18, more suitably from 1 to about 9, carbon atoms or such hydrocarbyl groups containing an oxygen, sulfur, cyano or halogen or the like substitutent. Particularly suitable imidazolidine compounds include, for example, imidazolidine, 1-methylimidazolidine, 2-methylimidazolidine, 4-butylimidazolidine, 1-methyl-3-propylimidazolidine, 1-ethyl-4-methylimidazolidine, 1-(3-hydroxypropyl)imidazolidine, 2-phenylimidazolidine, 1-benzylimidazolidine, 2-phenyl-1-methylimidazolidine, 4-cyanoimidazolidine, 4-chloroimidazolidine, 4-bromo-1-methylimidazolidine, any combination thereof and the like.

Suitable imidazoline compounds which can be employed herein include, for example, those represented by the following formula VI

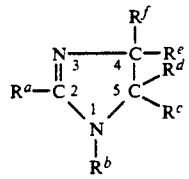

Formula VI.

wherein each $R^a$, $R^b$, $R^c$, $R^d$, $R^e$, and $R^f$ is independently hydrogen, halogen, cyano or a hydrocarbyl group having suitably from 1 to about 18, more suitably from 1 to about 9, carbon atoms or such hydrocarbyl groups containing an oxygen, sulfur, cyano or halogen or the like substitutent. Particularly suitable imidazoline compounds include, for example, imidazoline, 1-methylimidazolidine, 2-methylimidazolidine, 4-butylimidazolidine, 1-methyl-2-propylimidazolidine, 1-ethyl-4-methylimidazolidine, 1-(3-hydroxypropyl)imidazolidine, 2-phenylimidazolidine, 1-benzylimidazolidine, 2-phenyl-1-methylimidazolidine, 4-cyanoimidazolidine, 5-chloroimidazolidine, 5-bromo-1-methylimidazolidine, any combination thereof and the like.

Suitable thiazole compounds which can be employed herein include, for example, those represented by the following formula VII

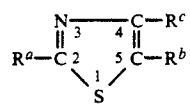

Formula VII.

wherein each $R^a$, $R^b$, and $R^c$ is independently hydrogen, halogen, cyano or a hydrocarbyl group having suitably from 1 to about 18, more suitably from 1 to about 9, carbon atoms or such hydrocarbyl groups containing an oxygen, sulfur, cyano or halogen or the like substitutent. Particularly suitable thiazole compounds include, for example, thiazole, 2-methylthiazole, 5-methylthiazole, 4-butylthiazole, 2-methyl-4-propylthiazole, 4-ethyl-5-methylthiazole, 2-(3-hydroxypropyl)thiazole, 2-phenylthiazole, 2-benzylthiazole, 4-phenyl-5-methylthiazole, 2-cyanothiazole, 5-chlorothiazole, 5-bromo-2-methylthi..zole, any combination thereof and the like.

Suitable pyrrole compounds which can be employed herein include, for example, those represented by the following formula VIII

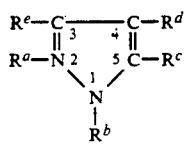

Formula VIII.

wherein each $R^a$, $R^b$, $R^c$, $R^d$, and $R^e$ is independently hydrogen, halogen, cyano or a hydrocarbyl group having suitably from 1 to about 18, more suitably from 1 to about 9, carbon atoms or such hydrocarbyl groups containing an oxygen, sulfur, cyano or halogen or the like substitutent. Particularly suitable pyrrole compounds include, for example, pyrrole, 1-methylpyrrole, 2-methylpyrrole, 3-butylpyrrole, 1-methyl-2-propylpyrrole, 2-ethyl-3-methylpyrrole, 1-(3-hydroxypropyl)pyrrole, 2-phenylpyrrole, 1-benzylpyrrole, 2-phenyl-1-methylpyrrole, 3-cyanopyrrole, 3-chloropyrrole, 2-bromo-1-methylpyrrole, any combination thereof and the like.

Suitable pyridine compounds which can be employed herein include, for example, those represented by the following formula IX

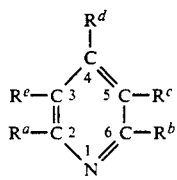

Formula IX.

wherein each $R^a$, $R^b$, $R^c$, $R^d$, and $R^e$ is independently hydrogen, halogen, cyano, or a hydrocarbyl group having suitably from 1 to about 18, more suitably from 1 to about 9, carbon atoms or such hydrocarbyl groups containing an oxygen, sulfur, cyano or halogen or the like substitutent. Particularly suitable pyridine compounds include, for example, pyridine, 2-methylpyridine, 3-methylpyridine, 4-butylpyridine, 2-methyl-3-propylpyridine, 3-ethyl-4-methylpyridine, 4-(3-hydroxypropyl)pyridine, 2-phenylpyridine, 3-benzylpyridine, 4-phenyl-2-methylpyridine, 3-cyanopyridine, 2-chloropyridine, 3-bromo-5-methylpyridine, any combination thereof and the like.

Suitable pyrazine compounds which can be employed herein include, for example, those represented by the following formula X

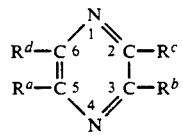

Formula X.

wherein each $R^a$, $R^b$, $R^c$, and $R^d$ is independently hydrogen, halogen, cyano, or a hydrocarbyl group having suitably from 1 to about 18, more suitably from 1 to about 9, carbon atoms or such hydrocarbyl groups containing an oxygen, sulfur, cyano or halogen or the like substitutent. Particularly suitable pyrazine compounds include, for example, pyrazine, 2-methylpyrazine, 3-methylpyrazine, 2-butylpyrazine, 2-methyl-5-propylpyrazine, 2-ethyl-6-methylpyrazine, 2-(3-hydroxypropyl)pyrazine, 2-phenylpyrazine, 2-benzylpyrazine, 2-phenyl-3-methylpyrazine, 2-cyanopyrazine, 2-chloropyrazine, 2-bromo-5-methylpyrazine, any combination thereof and the like.

Suitable pyridazine compounds which can be employed herein include, for example, those represented by the following formula XI

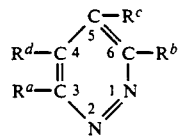

Formula XI.

wherein each $R^a$, $R^b$, $R^c$, and $R^d$ is independently hydrogen, halogen, cyano, or a hydrocarbyl group having suitably from 1 to about 18, more suitably from 1 to about 9, carbon atoms or such hydrocarbyl groups containing an oxygen, sulfur, cyano or halogen or the like substitutent. Particularly suitable pyridazine compounds include, for example, pyridazine, 3-methylpyridazine, 4-methylpyridazine, 3-butylpyridazine, 3-methyl-4-propylpyridazine, 3-ethyl-6-methylpyridazine, 4-(3-hydroxypropyl)pyridazine, 3-phenylpyridazine, 4-benzylpyridazine, 4-phenyl-5-methylpyridazine, 4-cyanopyridazine, 4-chloropyridazine, 3-bromo-5-methylpyridazine, any combination thereof and the like.

Suitable pyrrolidine compounds which can be employed herein include, for example, those represented by the following formula XII

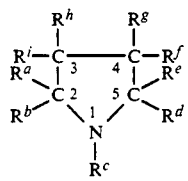

Formula XII.

wherein each $R^a$, $R^b$, $R^c$, $R^d$, $R^e$, $R^f$, $R^g$, $R^h$, and $R^i$ is independently hydrogen, halogen, cyano, or a hydrocarbyl group having from 1 to about 18 carbon atoms or such hydrocarbyl groups containing an oxygen, sulfur, cyano or halogen or the like substitutent. Particularly suitable compounds include, for example, pyrrolidine, 1-methyl-pyrrolidine, 4-phenylpyrrolidine, 2-methylpyrrolidine, 3-methylpyrrolidine, 1-butylpyrrolidine, 1-methyl-2-propylpyrrolidine, 3-ethyl-4-methyl-pyrrolidine, 2-(3-hydroxypropyl)pyrrolidine, 1-phenyl-2-methylpyrrolidine, 2-cyanopyrrolidine, 2-chloropyrrolidine, 2-bromo-1-methylpyrrolidine, any combination thereof and the like.

Suitable morpholine compounds which can be employed herein include, for example, those represented by the following formula XIII

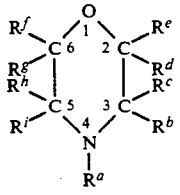

Formula XIII.

wherein each $R^a$, $R^b$, $R^c$, $R^d$, $R^e$, $R^f$, $R^g$, $R^h$, and $R^i$ is independently hydrogen, halogen, cyano, or a hydrocarbyl group having suitably from 1 to about 18, more suitably from 1 to about 9, carbon atoms or such hydrocarbyl groups containing an oxygen, sulfur, cyano or halogen or the like substitutent. Particularly suitable morpholine compounds include, for example, morpholine, 4-methylmorpholine, 3-methylmorpholine, 4-butylmorpholine, 4-methyl-3-propylmorpholine, 2- ethyl-3-methylmorpholine, 4-(3-hydroxypropyl)-morpholine, 2-phenylmorpholine, 4-benzylmorpholine, 3-phenyl-1-methylmorpholine, 3-cyanomorpholine, 3-chloromorpholine, 3-bromo-4-methylmorpholine, any combination thereof and the like.

Suitable pyrimidine compounds which can be employed herein include, for example, those represented by the following formula XIV

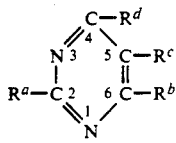

Formula XIV.

wherein each $R^a$, $R^b$, $R^c$, and $R^d$ is independently hydrogen, halogen, cyano, or a hydrocarbyl group having suitably from 1 to about 18, more suitably from 1 to about 9, carbon atoms or such hydrocarbyl groups containing an oxygen, sulfur, cyano or halogen or the like substitutent. Particularly suitable pyrimidine compounds which can be employed herein include, for example, pyrimidine, 2-methylpyrimidine, 4-methylpyrimidine, 2-butylpyrimidine, 2-methyl-4-propylpyrimidine, 4-ethyl-5-methylpyrimidine, 2-(3-hydroxypropyl)pyrimidine, 2-phenylpyrimidine, 2-benzylpyrimidine, 4-phenyl-2-methylpyrimidine, 4-cyanopyrimidine, 2-chloropyrimidine, 4-bromo-2-methylpyrimidine, any combination thereof and the like.

Suitable quinoxaline compounds which can be employed herein include, for example, those represented by the following formula XV

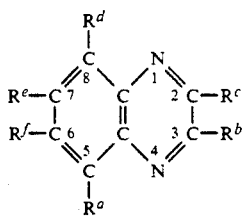

Formula XV.

wherein each $R^a$, $R^b$, $R^c$, $R^d$, $R^e$, and $R^f$ is independently hydrogen, halogen, cyano, or a hydrocarbyl group having suitably from 1 to about 18, more suitably from 1 to about 9, carbon atoms or such hydrocarbyl groups containing an oxygen, sulfur, cyano or halogen or the like substitutent. Particularly suitable quinoxaline compounds include, for example, quinoxaline, 2-methylquinoxaline, 2-methylquinoxaline, 2-butylquinoxaline, 2-methyl-3-propylquinoxaline, 5-ethyl-6-methylquinoxaline, 2-(3-hydroxypropyl)quinoxaline, 2-phenylquinoxaline, 5-benzylquinoxaline, 2-phenyl-5-methylquinoxaline, 2-cyanoquinoxaline, 2-chloroquinoxaline, 2-bromo-5-methylquinoxaline, any combination thereof and the like.

Suitable quinazoline compounds which can be employed herein include, for example, those represented by the following formula XVI

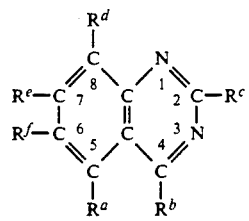

Formula XVI.

wherein each $R^a$, $R^b$, $R^c$, $R^d$, $R^e$, and $R^f$ is independently hydrogen, halogen, cyano, or a hydrocarbyl group having suitably from 1 to about 18, more suitably from 1 to about 9, carbon atoms or such hydrocarbyl groups containing an oxygen, sulfur, cyano or halogen or the like substitutent. Suitable quinazoline compounds include, for example, quinazoline, 2-methylquinazoline, 4-methylquinazoline, 2-butylquinazoline, 2-methyl-4-propylquinazoline, 5-ethyl-6-methylquinazoline, 2-(3-hydroxypropyl)quinazoline, 2-phenylquinazoline, 2-benzylquinazoline, 2-phenyl-4-methylquinazoline, 4-cyanoquinazoline, 4-chloroquinazoline, 2-bromo-4-methylquinazoline, any combination thereof and the like.

Suitable phthalazine compounds which can be employed herein include, for example, those represented by the following formula XVII

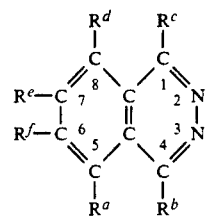

Formula XVII.

wherein each $R^a$, $R^b$, $R^c$, $R^d$, $R^e$, and $R^f$ is independently hydrogen, halogen, cyano, or a hydrocarbyl group having suitably from 1 to about 18, more suitable from 1 to about 9, carbon atoms or such hydrocarbyl groups containing an oxygen, sulfur, cyano or halogen or the like substitutent. Suitable phthalazine compounds include, for example, phthalazine, 1-methylphthalazine, 6-methylphthalazine, 1-butylphthalazine, 1-methyl-4-propylphthalazine, 1-ethyl-6-methylphthalazine, 1-(3-hydroxypropyl)phthalazine, 5-phenylphthalazine, 1-benzylphthalazine, 1-phenyl-4-methylphthalazine, 1-cyanophthalazine, 1-chlorophthalazine, 1-bromo-4-methylphthalazine, any combination thereof and the like.

Suitable quinoline compounds which can be employed herein include, for example, those represented by the following formula XVIII

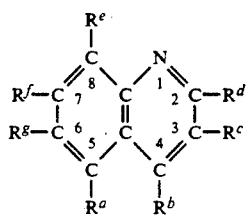

Formula XVIII.

wherein each $R^a$, $R^b$, $R^c$, $R^d$, $R^e$, $R^f$ and $R^g$ is independently hydrogen, halogen, cyano, or a hydrocarbyl group having suitably from 1 to about 18, more suitably from 1 to about 9, carbon atoms or such hydrocarbyl groups containing an oxygen, sulfur, cyano or halogen or the like substitutent. Suitable quinoline compounds which can be employed herein include, for example, quinoline, 2-methylquinoline, 3-methylquinoline, 4-butylquinoline, 5-methyl-2-propylquinoline, 2-ethyl-3-methylquinoline, 3-(3-hydroxypropyl)quinoline, 3-phenylquinoline, 4-benzylquinoline, 3-phenyl-2-methyl-quinoline, 3-cyano-quinoline, 4-chloroquinoline, 2-bromo-3-methyl-quinoline, any combination thereof and the like.

Suitable purine compounds which can be employed herein include, for example, those represented by the following formula XIX

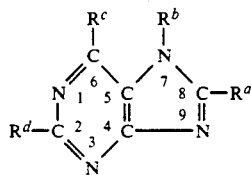

Formula XIX.

wherein each $R^a$, $R^c$, and $R^d$ is independently hydrogen, halogen, cyano, or a hydrocarbyl or hydrocarbyloxy group having suitably from 1 to about 18, more suitably from 1 to about 9, carbon atoms or such hydrocarbyl groups containing an oxygen, sulfur, cyano or halogen or the like substitutent; and $R^b$ is independently hydrogen or a hydrocarbyl or a hydrocarbyloxy group having suitably from 1 to about 18, more suitably from 1 to about 9, carbon atoms or such hydrocarbyl groups containing an oxygen, sulfur, cyano or halogen or the like. Suitable purine compounds include, for example, purine, 2-methylpurine, 8-methylpurine, 6-butylpurine, 2-methyl-8-propylpurine, 6-ethyl-8-methylpurine, 8-(3-hydroxypropyl)purine, 2-phenylpurine, 2-benzylpurine, 6-phenyl-2-methylpurine, 8-cyanopurine, 2-chloropurine, 8-bromo-2-methylpurine, any combination thereof and the like.

Suitable indazole compounds which can be employed herein include, for example, those represented by the following formula XX

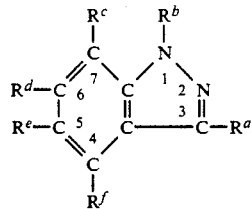

Formula XX.

wherein each $R^a$, $R^c$, $R^d$, $R^e$, and $R^f$ is independently hydrogen, halogen, cyano, or a hydrocarbyl group having suitably from 1 to about 18, more suitably from 1 to about 9, carbon atoms or such hydrocarbyl groups containing an oxygen, sulfur, cyano or halogen or the like substitutent; and $R^b$ is independently hydrogen or a hydrocarbyl or a hydrocarbyloxy group having suitably from 1 to about 18, more suitably from 1 to about 9, carbon atoms or such hydrocarbyl groups containing an oxygen, sulfur, cyano or halogen or the like. Suitable indazole compounds include, for example, indazole, 1-methylindazole, 3-methylindazole, 1-butylindazole, 1-methyl-3-propylindazole, 1-ethyl-5-methylindazole, 3-(3-hydroxypropyl)indazole, 3-phenylindazole, 6-benzylindazole, 6-phenyl-1-methyl-indazole, 3-cyanoindazole, 5-chloroindazole, 3-bromo-1-methylindazole, any combination thereof and the like.

Suitable indole compounds which can be employed herein include, for example, those represented by the following formula XXI

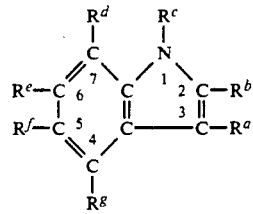

Formula XXI.

wherein each $R^a$, $R^b$, $R^d$, $R^e$, $R^f$, and $R^g$ is independently hydrogen, halogen, cyano, or a hydrocarbyl group having suitably from 1 to about 18, more suitably from 1 to about 9, carbon atoms or such hydrocarbyl groups containing an oxygen, sulfur, cyano or halogen or the like substitutent; and $R^c$ is independently hydrogen or a hydrocarbyl or a hydrocarbyloxy group having suitably from 1 to about 18, more suitably from 1 to about 9, carbon atoms or such hydrocarbyl groups containing an oxygen, sulfur, cyano or halogen or the like. Suitable indole compounds which can be employed herein include, for example, indole, 1-methylindole, 2-methylindole, 3-butylindole, 1-methyl-2-propylindole, 2-ethyl-3-methylindole, 1-(3-hydroxypropyl)indole, 2-phenylindole, 1-benzyl-indole, 2-phenyl-1-methylindole, 2-cyanoindole, 5-chloroindole, 3-bromo-1-methylindole, any combination thereof and the like.

Suitable indolizine compounds which can be employed herein include, for example, those represented by the following formula XXII

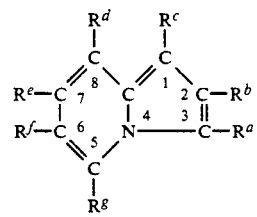

Formula XXII.

wherein each $R^a$, $R^b$, $R^d$, $R^e$, $R^f$, and $R^g$ is independently hydrogen, halogen, cyano, or a hydrocarbyl group having suitably from 1 to about 18, more suitably from 1 to about 9, carbon atoms or such hydrocarbyl groups containing an oxygen, sulfur, cyano or halogen or the like substitutent; and $R^c$ is independently hydrogen or a hydrocarbyl or a hydrocarbyloxy group having suitably from 1 to about 18, more suitably from 1 to about 9, carbon atoms or such hydrocarbyl groups containing an oxygen, sulfur, cyano or halogen or the like. Suitable indolizine compounds include, for example, indolazine, 1-methylindolizine, 2-methylindolizine, 3-butylindolizine, 5-methyl-1-propylindolizine, 2-ethyl-1-methyl-indolizine, 6-(3-hydroxypropyl)indolizine, 3-phenylindolizine, 7-benzylindolizine, 2-phenyl-3-methylindolizine, 5-cyanoindolizine, 7-chloroindolizine, 3-bromo-5-methylindolizine, any combination thereof and the like.

Suitable phenazine compounds which can be employed herein include, for example, those represented by the following formula XXIII

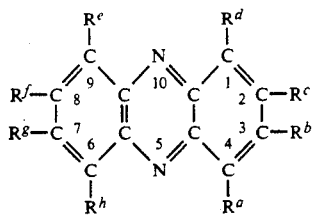

Formula XXIII.

wherein each $R^a$, $R^b$, $R^c$, $R^d$, $R^e$, $R^f$, $R^g$, and $R^h$ is independently hydrogen, halogen, cyano, or a hydrocarbyl group having suitably from 1 to about 18, more suitably from 1 to about 9, carbon atoms or such hydrocarbyl groups containing an oxygen, sulfur, cyano or halogen or the like substituent. Suitable phenazine compounds which can be employed herein include, for example, phenazine, 1-methylphenazine, 2-methylphenazine, 2-butylphenazine, 1-methyl-7-propylphenazine, 1-ethyl-4-methylphenazine, 2-(3-hydroxypropyl)phenazine, 1-phenylphenazine, 1-benzylphenazine, 1-phenyl-7-methylphenazine, 2-cyanophenazine, 1-chlorophenazine, 1-bromo-2-methyl-phenazine, any combination thereof and the like.

Suitable phenarsazine compounds which can be employed herein include, for example, those represented by the following formula XXIV

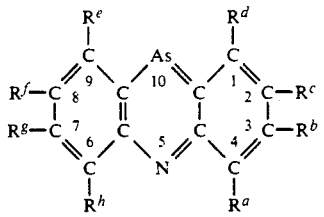

Formula XXIV.

wherein each $R^a$, $R^b$, $R^c$, $R^d$, $R^e$, $R^f$, $R^g$, and $R^h$ is independently hydrogen, halogen, cyano, or a hydrocarbyl group having suitably from 1 to about 18, more suitably from 1 to about 9, carbon atoms or such hydrocarbyl groups containing an oxygen, sulfur, cyano or halogen or the like substitutent. Suitable phenarsazine compounds which can be employed herein include, for example, phenarsazine, 1-methylphenarsazine, 2-methylphenarsazine, 4-butylphenarsazine, 1-methyl-6-propylphenarsazine, 2-ethyl-3-methylphenarsazine, 1-(3-hydroxypropyl)phenarsazine, 4-phenylphenarsazine, 3-benzylphenarsazine, 2-phenyl-7-methylphenarsazine, 3-cyanophenarsazine, 1-chlorophenarsazine, 1-bromo-8-methylphenarsazine, any combination thereof and the like.

Suitable phenothiazine compounds which can be employed herein include, for example, those represented by the following formula XXV

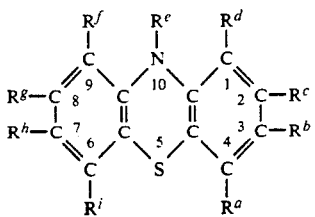

Formula XXV.

wherein each $R^a$, $R^b$, $R^c$, $R^d$, $R^f$, $R^g$, $R^h$, and $R^i$ is independently hydrogen, halogen, cyano, or a hydrocarbyl group having suitably from 1 to about 18, more suitably from 1 to about 9, carbon atoms or such hydrocarbyl groups containing an oxygen, sulfur, cyano or halogen or the like substitutent; and $R^e$ is independently hydrogen or a hydrocarbyl or a hydrocarbyloxy group having suitably from 1 to about 18, more suitably from 1 to about 9, carbon atoms or such hydrocarbyl groups containing an oxygen, sulfur, cyano or halogen or the like. Suitable phenothiazine compounds include, for example, phenothiazine, 10-methylphenothiazine, 1-methylphenothiazine, 2-butylphenolthiazine, 10-methyl-4-propylphenothiazine, 2-ethyl-3-methylphenothiazine, 4-(3-hydroxypropyl)phenothiazine, 10-phenylphenothiazine, 1-benzylphenothiazine, 10-phenyl-4-methylphenothiazine, 7-cyanophenothiazine, 4-chlorophenothiazine, 4-bromo-10-methylphenothiazine, any combination thereof and the like.

Suitable pyrroline compounds which can be employed herein include, for example, those represented by the following formula XXVI

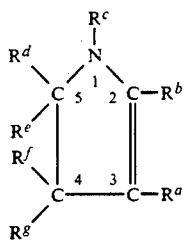

Formula XXVI.

wherein each $R^a$, $R^b$, $R^d$, $R^e$, $R^f$, and $R^g$ is independently hydrogen, halogen, cyano, or a hydrocarbyl group having suitably from 1 to about 18, more suitably from 1 to about 9, carbon atoms or such hydrocarbyl groups containing an oxygen, sulfur, cyano or halogen or the like substitutent; and $R^e$ is independently hydrogen or a hydrocarbyl or a hydrocarbyloxy group having suitably from 1 to about 18, more suitably from 1 to about 9, carbon atoms or such hydrocarbyl groups containing an oxygen, sulfur, cyano or halogen or the like. Suitable pyrroline compounds include, for example, pyrroline, 2-methylpyrroline, 4-methyl-pyrroline, 5-butylpyrroline, 5-methyl-1-propyl-pyrroline, 1-ethyl-3-methylpyrroline, 1-(3-hydroxy-propyl)pyrroline, 5-phenylpyrroline, 1-benzylpyrroline, 1-phenyl-4-methylpyrroline, 3-cyanopyrroline, 5-chloropyrroline, 2-bromo-1-methylpyrroline, any combination thereof and the like.

Suitable indoline compounds which can be employed herein include, for example, those represented by the following formula XXVII

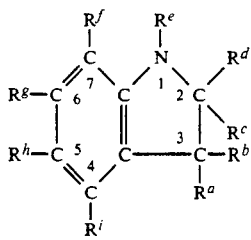

Formula XXVII.

wherein each $R^a$, $R^b$, $R^c$, $R^d$, $R^f$, $R^g$, $R^h$, and $R^i$ is independently hydrogen, halogen, cyano, or a hydrocarbyl group having suitably from 1 to about 18, more suitably from 1 to about 9, carbon atoms or such hydrocarbyl groups containing an oxygen, sulfur, cyano or halogen or the like substitutent; and $R^e$ is independently hydrogen or a hydrocarbyl or a hydrocarbyloxy group having suitably from 1 to about 18, more suitably from 1 to about 9, carbon atoms or such hydrocarbyl groups containing an oxygen, sulfur, cyano or halogen or the like. Particularly suitable indoline compounds include, for example, indoline, 1-methylindoline, 2-methylindoline, 3-butylindoline, 1-methyl-2-propylindoline, 2-ethyl-2-methylindoline, 1-(3-hydroxypropyl)indoline, 1-phenylindoline, 1-benzylindoline, 1-phenyl-2-methylindoline, 5-cyanoindoline, 7-chloroindoline, 5-bromo-1-methylindoline, any combination thereof and the like.

Suitable piperidine compounds which can be employed herein include, for example, those represented by the following formula XXVIII

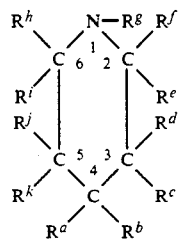

Formula XXVIII.

wherein each $R^a$, $R^b$, $R^c$, $R^d$, $R^e$, $R^f$, $R^h$, $R^i$, $R^j$, and $R^k$ is independently hydrogen, halogen, cyano, or a hydrocarbyl group having suitably from 1 to about 18, more suitably from 1 to about 9, carbon atoms or such hydrocarbyl groups containing an oxygen, sulfur, cyano or halogen or the like substitutent; and $R^g$ is independently hydrogen or a hydrocarbyl or a hydrocarbyloxy group having suitably from 1 to about 18, more suitably from 1 to about 9, carbon atoms or such hydrocarbyl groups containing an oxygen, sulfur, cyano or halogen or the like. Suitable piperidine compounds which can be employed herein include, for example, piperidine, 1-methylpiperidine, 2-methylpiperidine, 3-butylpiperidine, 1-methyl-2-propylpiperidine, 2-ethyl-4-methylpiperidine, 1-(3-hydroxypropyl)piperidine, 1-phenylpiperidine, 1-benzylpiperidine, 1-phenyl-2-methylpiperidine, 4-cyanopiperidine, 3-chloropiperidine, 4-bromo-1-methylpiperidine, any combination thereof and the like.

Suitable piperazine compounds which can be employed herein include, for example, those represented by the following formula XXIX

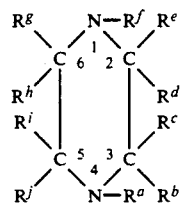

Formula XXIX.

wherein each $R^a$, $R^b$, $R^c$, $R^d$, $R^e$, $R^g$, $R^h$, $R^i$, and $R^j$ is independently hydrogen, halogen, cyano, or a hydrocarbyl group having suitably from 1 to about 18, more suitably from 1 to about 9, carbon atoms or such hydrocarbyl groups containing an oxygen, sulfur, cyano or halogen or the like substitutent; and $R^f$ is independently hydrogen or a hydrocarbyl or a hydrocarbyloxy group having suitably from 1 to about 18, more suitably from 1 to about 9, carbon atoms or such hydrocarbyl groups containing an oxygen, sulfur, cyano or halogen or the like. Particularly suitable piperazine compounds which can be employed herein include, for example, piperazine, 1-methylpiperazine, 2-methylpiperazine, 3-butylpiperazine, 1-methyl-4-propylpiperazine, 1-ethyl-3-methylpiperazine, 1(3-hydroxypropyl)-piperazine, 2-phenylpiperazine, 1-benzylpiperazine, 1-methyl-3-phenylpiperazine, 2-cyanopiperazine, 2-chloropiperazine, 1,4-dimethyl-2-bromopiperazine, any combination thereof and the like.

Suitable compounds having an average of more than one epoxide group per molecule which can be employed herein include, epoxy resins such as, for example, the glycidyl ethers of polyhydric phenols, i.e. compounds having an average of more than one aromatic hydroxyl group per molecule such as, for example, dihydroxy phenols, biphenols, bisphenols, halogenated biphenols, halogenated bisphenols, alkylated biphenols alkylated bisphenols, trisphenols, phenol-aldehyde novolac resins, substituted phenol-aldehyde novolac resins, phenol-hydrocarbon resins, substituted phenolhydrocarbon resins, any combination thereof and the like. Suitable such epoxy resins include, for example, those represented by the following formulas XXX-XXXIV

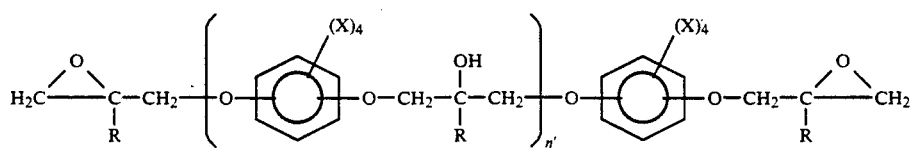

Formula XXX.

Formula XXXI.

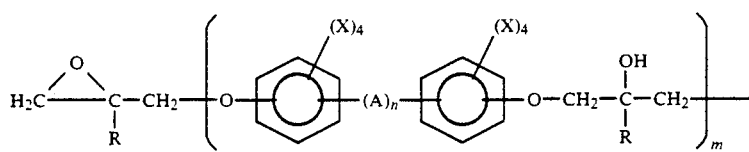

Formula XXXII.

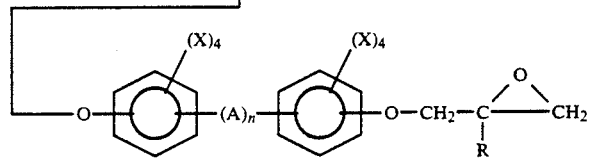

Formula XXXIII.

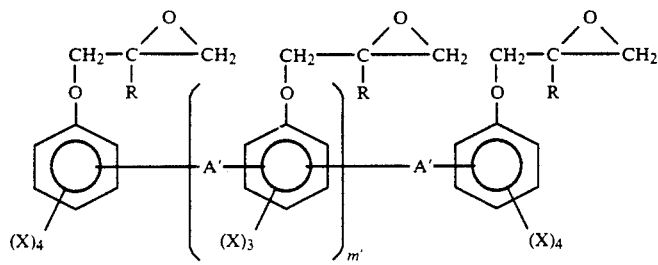

Formula XXXIV.

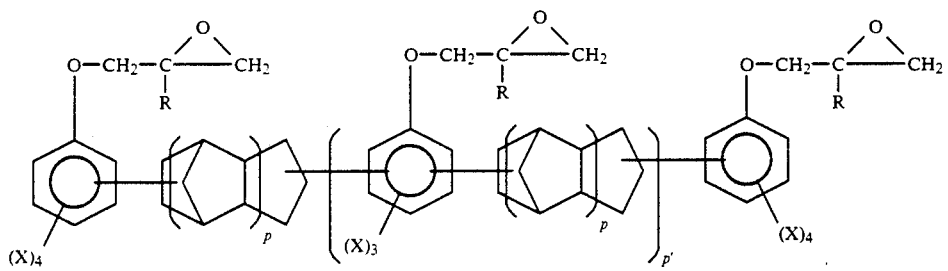

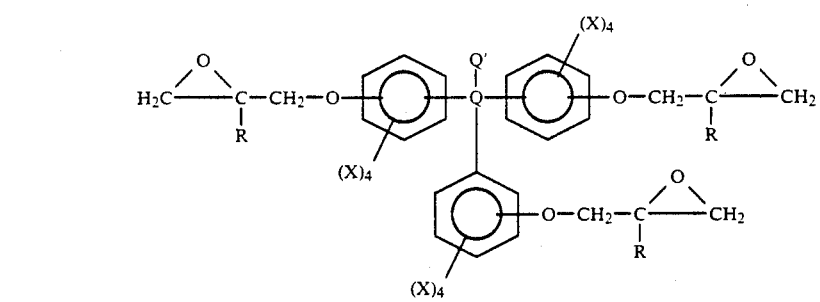

wherein each A is independently a divalent hydrocarbyl group having from 1 to about 9, preferably from 1 to about 4, carbon atoms, —O—, —S—, —S—S—, —SO—, —SO$_2$—, or —CO—; each A' is independently a divalent hydrocarbyl group having from 1 to about 9, preferably from 1 to about 4 carbon atoms; Q is a hydrocarbyl group having from 1 to about 10 carbon atoms; Q' is hydrogen, halogen, cyano or an alkyl group having from 1 to about 4 carbon atoms; each R is independently hydrogen, halogen, cyano or an alkyl group having from 1 to about 4 carbon atoms; each X is independently hydrogen, halogen, or a hydrocarbyl or hydrocarbyloxy group having from 1 to about 9, preferably from 1 to about 4 carbon atoms; m has an average value from zero to about 12, preferably from about zero to about 9, most preferably from about 0.03 to about 3; m' has an average value from about 0.01 to about 8, preferably from about 0.5 to about 4; n has a value of zero or 1; n' has an average value of from zero to about 12, preferably from zero to about 9, most preferably from about 0.03 to about 3; each p suitably has a value from zero to about 10, more suitably from zero to about 6, most suitably from about 1 to about 3; and each p' suitably has a value from zero to about 8, more suitably from about 1 to about 6, most suitably from about 2 to about 4. Also suitable are the oligomers of the epoxy resin represented by formula XXXIV.

The term hydrocarbyl as employed herein means any aliphatic, cycloaliphatic, aromatic, aryl substituted aliphatic or cycloaliphatic, or aliphatic or cycloaliphatic substituted aromatic groups. The aliphatic groups can be saturated or unsaturated. Likewise, the term hydrocarbyloxy means a hydrocarbyl group having an oxygen linkage between it and the carbon atom to which it is attached.

Particularly suitable such epoxy resins include, for example, the diglycidyl ethers of resorcinol, catechol, hydroquinone, biphenol, bisphenol A, bisphenol AP (1,1-bis(4-hydroxylphenyl)-1-phenyl ethane), bisphenol F, bisphenol K, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenol, tetramethyl-tetrabromobiphenol, tetramethyltribromobiphenol, tetrachlorobisphenol A, any combination thereof and the like.

Also suitable as the epoxide compound which can be employed in the present invention include those partially advanced epoxy resins disclosed by Bertram et al. in U.S. Pat. No. 4,594,291 which is incorporated herein by reference.

Also suitable as the epoxide compound are the glycidyl ethers of compounds having an average of more than one aliphatic hydroxyl group per molecule such as, for example, aliphatic diols, polyether diols, polyether triols, polyether tetrols, any combination thereof and the like. Also suitable are the alkylene oxide adducts of compounds containing an average of more than one aromatic hydroxyl group per molecule such as, for example, the ethylene oxide, propylene oxide, or butylene oxide adducts of dihydroxy phenols, biphenols, bisphenols, halogenated bisphenols, alkylated bisphenols, trisphenols, phenol-aldehyde novolac resins, halogenated phenol-aldehyde novolac resins, alkylated phenol-aldehyde novolac resins, hydrocarbon-phenol resins, hydrocarbon-halogenated phenol resins, or hydrocarbon-alkylated phenol resins, or any combination thereof and the like.

Suitable aromatic hydroxyl containing compounds which can be employed herein include, for example, compounds having an average of more than one phenolic hydroxyl group per molecule. Suitable such compounds include, for example, dihydroxy phenols, biphenols, bisphenols, halogenated bisphenols, alkylated bisphenols, trisphenols, phenol-aldehyde resins, halogenated phenol-aldehyde novolac resins, alkylated phenol-aldehyde novolac resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins, any combination thereof and the like. Particularly suitable aromatic hydroxyl containing compounds include, for example, those represented by the following formulas XXXV–XXXIX

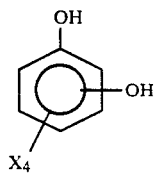

Formula XXXV.

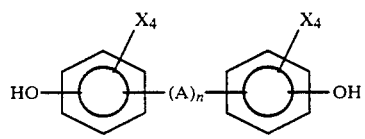

Formula XXXVI.

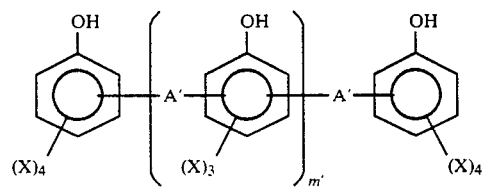

Formula XXXVII.

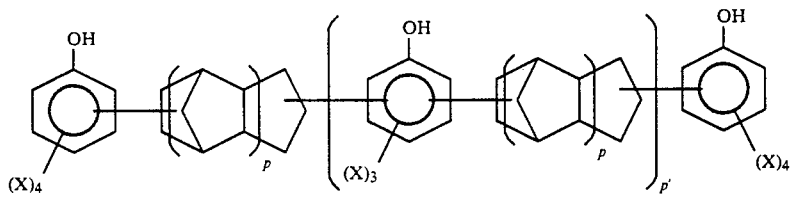

Formula XXXVIII.

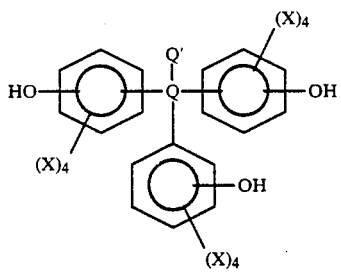

Formula XXXIX.

wherein A, A', Q, Q' X, n and m are as defined above in formulas XII–XVI. Particularly suitable aromatic hydroxyl-containing materials include, for example, biphenol, bisphenol A, bisphenol K, tetrabromobisphenol A, tetrabromobisphenol K, resorcinol, phenol-aldehyde novolac resins, cresol-aldehyde novolac resins, phenol-hydroxybenzaldehyde resins, cresol-hydroxybenzaldehyde resins, tetramethylbiphenol, tetramethyltribromobiphenol, tetramethyltetrabromobiphenol, tetrachorobisphenol A, any combination thereof and the like. Also suitable are the oligomers of the multifunctional phenolic compounds represented by the formula X.

These and other suitable aromatic hydroxyl-containing compounds are disclosed in U.S. Pat. No. 4,594,291 issued Jun. 10, 1986 by Bertram et al which is incorporated herein by reference in its entirety.

The aromatic hydroxyl-containing compounds are employed in amounts which provide a ratio of aromatic hydroxyl groups to epoxy groups suitably from about 0.05:1 to about 20:1, more suitably from about 0.1:1 to about 10:1, most suitably from about 0.2:1 to about 5:1.

When the epoxide compound is in excess amounts with respect to the aromatic hydroxyl-containing compound, the resultant product terminates in epoxide groups. When the aromatic hydroxyl-containing compound is in excess amounts with respect to the epoxide compound, the resultant product will terminate in aromatic hydroxyl groups. When the ratio of aromatic hydroxyl groups to epoxy groups is substantially 1:1, the resultant product can terminate in either of both of these groups. The closer the ratio is to 1:1, usually, the higher the molecular weight.

The precatalyzed compositions of the present invention can contain, if desired, pigments, fillers, dyes, diluents, solvents, stabilizers, epoxy resin curing agents, any combination thereof and the like.

Suitable stabilizer materials and curing agents which can be employed herein include, for example, those disclosed in the aforementioned U.S. Pat. No. 4,594,291 by Bertram et al which is incorporated herein by reference in its entirety.

The compositions of the present invention are useful in the preparation of formulations for use in the preparation of electrical and structural laminates and composites, coatings, castings, moldings, encapsulants and the like. They can be employed in the conventional methods or the newer reaction transfer molding (RTM) and reaction injection molding (RIM) techniques.

The following examples are illustrative of the invention but are not to be construed as to limiting the scope thereof in any manner.

EXAMPLE 1

The following components are employed in the examples.

Solution A

One mole of 2-methylimidazole is mixed with 1.03 moles of aqueous fluoroboric acid in the presence of a sufficient quantity of methanol such that the weight of 2-methylimidazole and solid fluoroboric acid is 40 to 50% by weight of the total mixture.

Solution B

One mole of 2-methylimidazole is mixed with 1.03 moles of boric acid in the presence of an amount of water approximately equal to the weight of the boric acid and a sufficient amount of methanol such that the weight of 2-methylimidazole and boric acid is 40 to 50% by weight of the total mixture.

Catalyst Preparation

The catalysts used in the following Examples use either Solution A or B, or blends thereof. Alternately, the catalysts are prepared by adding, either a mixture or separately, fluoboric acid and boric acid to 2-methylimidazole and diluting the resulting mixture with methanol to 40% to 50% solids based on the three components. It is generally preferable to digest the resulting mixtures for 16 to 24 hours at 50° C. to 60° C. before use.

Catalyst A-1: Solution A, this catalyst is used immediately after mixing.

Catalyst A-2: Solution A, this catalyst is stored in an oven at 60° C. for 24-hours before using.

Catalyst 1: Solution B, this catalyst is used immediately after mixing.

Catalyst 1-A: Solution B, this catalyst is stored in an oven at 60° C. for 24-hours before using.

Catalyst 2: A quantity of Solution A sufficient to give 0.2 moles of 2-methylimidazole is mixed with a quantity of Solution B sufficient to give 0.1 moles of 2-methylimidazole. This catalyst is used immediately after mixing.

Catalyst 2-A: A quantity of Solution A sufficient to give 0.2 moles of 2-methylimidazole is mixed with a quantity of Solution B sufficient to give 0.1 moles of 2-methylimidazole. This combined solution is then stored in an oven at 60° C. for 24-hours before using.

Catalyst 3: A quantity of Solution A sufficient to give 0.2 moles of 2-methylimidazole is mixed with a quantity of Solution B sufficient to give 0.2 moles of 2-methylimidazole. This catalyst is used immediately after mixing.

Catalyst 3-A: A quantity of Solution A sufficient to give 0.2 moles of 2-methylimidazole is mixed with a quantity of Solution B sufficient to give 0.2 moles of 2-methylimidazole. This combined solution is then stored in an oven at 60° C. for 24-hours before using.

Catalyst 4: A quantity of Solution A sufficient to give 0.1 moles of 2-methylimidazole is mixed with a quantity of Solution B sufficient to give 0.1 moles of 2-methylimidazole. This catalyst is used immediately after mixing.

Catalyst 5: A quantity of Solution A sufficient to give 0.1 moles of 2-methylimidazole is mixed with a quantity of Solution B sufficient to give 0.2 moles of 2-methylimidazole. This catalyst is used immediately after mixing.

EXAMPLES 1-6

Viscosity Stability

To an 80% solution by weight in propylene glycol monomethylether acetate of (1) the diglycidyl ether of bisphenol A having an epoxide equivalent weight of 181.5 and (2) the para, para isomer of bisphenol A mixed at a molar ratio of 0.98 mole of bisphenol A per mole of epoxy, are added portions of the above catalyst solutions sufficient to give a molar ratio of 2-methylimidazole to epoxy of 3 to 9 millimoles per mole as shown in Table 1. The initial viscosity measured at 25° C. is recorded.

A portion of the samples are then stored in an oven at 50° C. Periodically samples are removed and the viscosity, measured at 25° C., is recorded. The viscosity data and percent increase in viscosity relative to the second day is recorded in Table 1.

Reactivity

The relative reactivity of these catalysts for promoting the reaction of an epoxy with a phenolic compound is obtained by blending the catalysts with an epoxy and bisphenol as described above, but without a solvent. The bisphenol is dissolved in the epoxy by heating to approximately 100° C. to 150° C., then cooled to approximately 60° C. and the catalyst added and stirred until homogeneous. The change in viscosity with time at 150° C. is then recorded. The period before a notable change in viscosity is observed is recorded in Table 2, as the induction time. The slope of the the line obtained from plotting the log of viscosity vs time is recorded in Table 2, as the relative rate of reactivity.

TABLE I

| | Ex. 1 | Ex. 2 |
|---|---|---|
| Catalyst | | |
| Type | 2 | 3 |
| Amount[a] | 3 | 3 |
| Init. Visc. | | |
| cps | 1583 | 1558 |
| Pa·s | 1.583 | 1.558 |
| 1 Day Visc. | | |
| cps | 1740 | 1760 |
| Pa·s | 1.740 | 1.760 |
| % Incr.[c] | 10 | 13 |
| 5 Day Visc. | | |
| cps | 2202 | 2443 |
| Pa·s | 2.202 | 2.443 |
| % Incr. | 27 | 39 |
| 7 Day Visc. | | |
| cps | 2423 | 3391 |
| Pa·s | 2.423 | 3.391 |
| % Incr. | 39 | 93 |
| 12 Day Visc. | | |
| cps | 3495 | 7058 |
| Pa·s | 3.495 | 7.058 |
| % Incr.[b] | 101 | 301 |

[a]milliequivalents of catalyst per equivalent of epoxide.
[b]rounded to the nearest

TABLE II

| Ex. No. | Catalyst Type | Catalyst Amt.[a] | Induction Time Minutes | Relative Reaction Rate |
|---|---|---|---|---|
| 1 | 2 | 3 | 21 | 68 |
| 2 | 3 | 3 | 19 | 67 |
| 3 | 1-A | 3 | ND[b] | ND[b] |
| 4 | 2-A | 3 | 17 | 76 |
| 5 | 5 | 9 | 8 | 130 |
| 6 | 3-A | 3 | 15 | 81 |
| 7 | A-1 | 9 | 85 | 42 |
| 8 | 1 | 4.5 | 10 | 84 |
| 9 | 1 | 9 | 5 | 240 |
| 10 | 2 | 9 | 20 | 68 |
| 11 | 3 | 9 | 20 | 67 |

[a]Milliequivalents of catalyst per equivalent of epoxide.
[b]Not determined.

What is claimed is:

1. A catalytic product resulting from contacting (1) at least one compound selected from the group consisting of (a) at least one onium compound of the element nitrogen, phosphorus, sulfur or arsenic; (b) an amine compound free of hydroxyl groups; and (c) a mixture of any two or more of the (a) and (b) components; with (2) boric acid; or with (3) a mixture of (a) boric acid and (b) at least one acid having a weak nucleophilic anion; wherein the mole ratio of component (2) to component (1) is from about 0.6:1 to about 1.35:1, or the mole ratio of component (3) to component (1) is from about 0.6:1 to about 1.35:1.

2. A catalytic product of claim 1 wherein components (3a) and (3b) are employed in amounts which provides a ratio of moles of component (3a) to (3b) of from about 0.1:1 to about 0.9:1.

3. A catalytic product of claim 1 wherein
   (a) components (1) and (2) are employed in amounts which provide a ratio of moles of component (2) per mole of component (1) of from about 0.75:1 to about 1.35:1;
   (b) components (1) and (3) are employed in amounts which provide a ratio of moles of component (3) per mole of component (1) of from about 0.75:1 to about 1.35; and
   (c) components (3a) and (3b) are employed in amounts which provides a ratio of moles of component (3a) to (3b) of from about 0.3:1 to about 0.7:1.

4. A catalytic product of claim 3 wherein said onium compound is ethyltriphenyl phosphonium acetate, ethyltriphenyl phosphonium acetate.acetic acid complex, tetrabutyl phosphonium acetate, tetrabutyl phosphonium acetate.acetic acid complex, ethyltriphenyl phosphonium chloride, ethyl triphenyl phosphonium iodide, tetrabutyl phosphonium chloride, tetrabutyl phosphonium iodide, tetrabutylphosphonium hydroxide, or any combination thereof and said acid having a weak nucleophilic anion is fluoboric acid.

5. A catalytic product of claim 3 wherein component (1) is a nitrogen containing onium compound.

6. A catalytic product of claim 5 wherein said ammonium compound is tetrabutylammonium hydroxide, tetraethylammonium hydroxide, tetramethylammonium hydroxide, ethyltri(2-ethoxyethyl)ammonium hydroxide, triethyl(2-thioethylethyl)ammonium hydroxide, N-methyl-N-methylenemethanaminium acetate, N-methyl-N-methylenemethanaminium acetate.acetic acid complex, N-methyl-N-methylenemethanaminium chloride, N-methyl-N-methylenemethanaminium iodide, N-methylpyridinium acetate, N-methylpyridinium acetate.acetic acid complex, N-methylpyridinium chloride, N-methylpyridinium iodide, 1-ethyl-2,3-dimethylimidazolium acetate, 1-ethyl-2,3-dimethylimidazolium acetate.acetic acid complex, 1-ethyl-2,3-dimethylimidazolium chloride, 1-ethyl-2,3-dimethylimidazolium iodide, N-methylquinolinium acetate, N-methylquinolinium acetate.acetic acid complex, N-methylquinolinium chloride, N-methylquinolinium iodide, N-methyl-1,3,5-triazinium acetate, N-methyl-1,3,5-triazinium acetate.acetic acid complex, N-methyl-1,3,5-triazinium chloride, N-methyl-1,3,5-triazinium iodide, or any combination thereof and said acid having a weak nucleophilic anion is fluoboric acid.

7. A catalytic product of claim 3 wherein component (1) is a non-heterocyclic amine.

8. A catalytic product of claim 7 wherein said non-heterocyclic amine is ethylamine, diethylamine, triethylamine, n-propylamine, di-n-propylamine, tri-n-propylamine, isopropylamine, diisopropylamine, triisopropylamine, butylamine, dibutylamine, tributylamine, methyldibutylamine, or any combination thereof and said acid having a weak nucleophilic anion is fluoboric acid.

9. A catalytic product of claim 3 wherein component (1) is a heterocyclic amine selected from the group consisting of imidazoles, imidazolidines, imidazolines, oxazoles, pyrroles, thiazoles, pyridines, pyrazines, morpholines, pyridazines, pyrimidines, pyrrolidines, pyrazoles, quinoxalines, quinazolines, phthalozines, quinolines, purines, indazoles, indoles, indolazines, phenazines, phenarsazines, phenothiazines, pyrrolines, indolines, piperidines, piperazines, or any combination thereof and said acid having a weak nucleophilic anion is fluoboric acid.

10. A catalytic product of claim 3 wherein component (1) is 2-methylimidazole, 2-phenylimidazole, 2-ethyl-4-methylimidazole or any combination thereof.

11. A mixture comprising (A) at least one compound containing an average of more than 1 vicinal epoxide group per molecule; and (B) a catalytic product resulting from contacting (1) at least one compound selected from the group consisting of (a) at least one onium compound of the element nitrogen, phosphorus, sulfur or arsenic; (b) at least one amine compound free of hydroxyl groups; and (c) a mixture of any two or more of the (B1a) and (B1b) components; with (2) boric acid; or with (3) a mixture of (a) boric acid and (b) at least one acid having a weak nucleophilic anion; wherein
  (i) components (A) and (B) are employed in amounts which provide a mole ratio of millimoles of component (B) per mole of component (A) of from about 0.05:1 to about 100:1;
  (ii) the mole ratio of component (B2) to component (B1) is from about 0.6:1 to about 1.35:1; or
  (iii) the mole ratio of component (B3) to component (B1) is from about 0.6:1 to about 1.35:1.

12. A mixture of claim 11 wherein component (B) is employed in an amount sufficient to catalyze the reaction between component (A) and an aromatic hydroxyl-containing compound when the mixture of components (A) and (B) is admixed with an aromatic hydroxyl-containing compound.

13. A mixture of claim 12 wherein
  (a) component (B) is employed in an amount which provides from about 0.05 to about 100 millimoles of catalytic product per epoxide equivalent contained in component (A); and
  (b) components (B3a) and (B3b) are employed in amounts which provides a ratio of moles of component (B3a) to (B3b) of from about 0.1:1 to about 0.9:1.

14. A mixture of claim 12 wherein
  (a) component (B) is employed in an amount which provides from about 0.5 to about 20 millimoles of catalytic product per epoxide equivalent contained in component (A);
  (b) components (B1) and (B2) are employed in amounts which provide a ratio of moles of component (B2) per mole of component (B1) of from about 0.75:1 to about 1.35:1;
  (c) components (B1) and (B3) are employed in amounts which provide a ratio of moles of component (B3) per mole of component (B1) of from about 0.75:1 to about 1.35:1; and
  (d) components (B3a) and (B3b) are employed in a (B3a) to (B3b) of from about 0.3:1 to about 0.7:1.

15. A mixture of claim 14 wherein
  (a) component (A) is a glycidyl ether of a polyhydric phenol; and
  (b) component (B1) is an onium compound of the element phosphorus.

16. A mixture of claim 15 wherein
  (a) component (A) is a diglycidyl ether of any of the following: resorcinol, catechol, hydroquinone, biphenol, bisphenol A, bispheol AP bisphenol F, bisphenol K, tetrabromobisphenol A, phenol-formaldehyde novolac resin, alkyl substituted phenol-formaldehyde resin, phenol-hydroxybenzaldehyde resin, cresol-hydroxybenzaldehyde resin, dicyclopentadiene-phenol resin, dicyclopentadiene-substituted phenol resin tetramethylbiphenol, tetramethyl-tetrabromobiphenol, tetramethyltribromobiphenol, tetrachlorobisphenol A, or any combination thereof;
  (b) component (B1) is ethyltriphenyl phosphonium acetate, ethyltriphenyl phosphonium acetate.acetic acid complex, tetrabutyl phosphonium acetate, tetrabutyl phosphonium acetate.acetic acid complex, ethyltriphenyl phosphonium chloride, ethyl triphenyl phosphonium iodide, tetrabutyl phosphonium chloride, tetrabutyl phosphonium iodide, tetrabutylphosphonium hydroxide, or any combination thereof; and
  (c) component (B3b) is fluoboric acid.

17. A mixture of claim 14 wherein
  (a) wherein component (A) is a glycidyl ether of a polyhydric phenol; and
  (b) component (B1) is a nitrogen containing onium compound.

18. A mixture of claim 17 wherein
  (a) component (A) is a diglycidyl ether of any of the following: resorcinol, catechol, hydroquinone, biphenol, bisphenol A, bisphenol F, bisphenol K, tetrabromobisphenol A, phenol-formaldehyde novolac resin, alkyl substituted phenol-formaldehyde resin, phenol-hydroxybenzaldehyde resin, cresol-hydroxybenzaldehyde resin, dicyclopentadiene-phenol resin, dicyclopentadiene-substituted phenol resin tetramethylbiphenol, tetramethyl-tetrabromobiphenol, tetramethyltribromobiphenol, tetrachlorobisphenol A, or any combination thereof;
  (b) component (B1) is tetrabutylammonium hydroxide, tetraethylammonium hydroxide, tetramethylammonium hydroxide, ethyltri(2-ethoxyethyl)ammonium hydroxide, triethyl(2-thioethylethyl)ammonium hydroxide, N-methyl-N-methylenemethanaminium acetate, N-methyl-N-methylenemethanaminium acetate.acetic acid complex, N-methyl-N-methylenemethanaminium chloride, N-methyl-N-methylenemethanaminium iodide, N-methylpyridinium acetate, N-methylpyridinium acetate.acetic acid complex, N-methylpyridinium chloride, N-methylpyridinium iodide, 1-ethyl-2,3-dimethylimidazolium acetate, 1-ethyl-2,3-dimethylimidazolium acetate.acetic acid complex, 1-ethyl-2,3-dimethylimidazolium chloride, 1-ethyl-2,3-dimethylimidazolium iodide, N-methylquinolinium acetate, N-methylquinolinium acetate.acetic acid complex, N-methylquinolinium chloride, N-methylquinolinium iodide, N-methyl-1,3,5-triazinium acetate, N-methyl-1,3,5-triazinium acetate.acetic acid complex, N-methyl-1,3,5-triazinium chloride, N-methyl-1,3,5-triazinium iodide, or any combination thereof; and
  (c) component (B3b) is fluoboric acid.

19. A mixture of claim 14 wherein
  (a) component (A) is a glycidyl ether of a polyhydric phenol; and
  (b) component (B1) is a non-heterocyclic amine.

20. A mixture of claim 19 wherein
  (a) component (A) is a diglycidyl ether of any of the following: resorcinol, catechol, hydroquinone, biphenol, bisphenol A, bisphenol F, bisphenol K, tetrabromobisphenol A, phenol-formaldehyde novolac resin, alkyl substituted phenol-formaldehyde resin, phenol-hydroxybenzaldehyde resin, cresol-hydroxybenzaldehyde resin, dicyclopentadiene-phenol resin, dicyclopentadiene-substituted phenol resin tetramethylbiphenol, tetramethyl-tetrabromobiphenol, tetramethyltribromobiphenol, tetrachlorobisphenol A, or any combination thereof;

(b) component (B1) is ethylamine, diethylamine, triethylamine, n-propylamine, di-n-propylamine, tri-n-propylamine, isopropylamine, diisopropylamine, triisopropylamine, butylamine, dibutylamine, tributylamine, methyldibutylamine, or any combination thereof;

(c) and component (B3b) is fluoboric acid.

21. A mixture of claim 14 wherein
(a) component (A) is a glycidyl ether of a polyhydric phenol;
(b) component (B1) is a heterocyclic amine selected from the group consisting of imidazoles, imidazolidines, imidazolines, oxazoles, pyrroles, thiazoles, pyridines, pyrazines, morpholines, pyridazines, pyrimidines, pyrrolidines, pyrazoles, quinoxalines, quinazolines, phthalozines, quinolines, purines, indazoles, indoles, indolazines, phenazines, phenarsazines, phenothiazines, pyrrolines, indolines, piperidines, piperazines, or any combination thereof; and
(c) component (B3b) is fluoboric acid.

22. A mixture of claim 21 wherein component (1) is 2-methylimidazole, 2-phenylimidazole, 2-ethyl-4-methylimidazole or any combination thereof.

23. A mixture comprising (A) at least one compound containing an average of more than 1 vicinal epoxide group per molecule; (B) at least one compound containing an average of more than 1 aromatic hydroxyl group per molecule; and (C) a sufficient amount to catalyze the reaction between components (A) and (B) of a catalytic product resulting from contacting (1) at least one compound selected from the group consisting of (a) at least one onium compound of the element nitrogen, phosphorus, sulfur or arsenic; (b) at least one amine compound; and (c) a mixture of any two or more of the (a) and (b) components; with (2) boric acid; or with (3) a mixture of (a) boric acid and (b) at least one acid having a weak nucleophilic anion.; wherein
  (i) components (A) and (C) are employed in amounts which provide a ratio of millimoles of component (C) per mole of component (A) of from about 0.05:1 to about 100:1;
  (ii) the mole ratio of component (C2) to component (C1) is from about 0.6:1 to about 1.35:1; or
  (iii) the mole ratio of component (C3) to component (C1) is from about 0.6:1 to about 1.35:1.

24. A mixture of claim 23 wherein
(a) components (A) and (B) are employed in amounts which provide a ratio of aromatic hydroxyl groups to epoxy groups suitably from about 0.05:1 to about 20:1; and
(b) component (C) is employed in an amount which provides from about 0.05 to about 100 millimoles of catalytic product per epoxide equivalent contained in component (A); and
(c) components (C3a) and (C3b) are employed in amounts which provides a ratio of moles of component (C3a) to (C3b) of from about 0.1:1 to about 0.9:1.

25. A mixture of claim 24 wherein
(a) components (A) and (B) are employed in amounts which provide a ratio of aromatic hydroxyl groups to epoxy groups suitably from about 0.2:1 to about 5:1;
(b) component (C) is employed in an amount which provides from about 0.5 to about 20 millimoles of catalytic product per epoxide equivalent contained in component (A);
(c) components (C1) and C2) are employed in amounts which provide a ratio of moles of component (C2) per mole of component (C1) of from about 0.75:1 to about 1.35:1;
(d) components (C1) and (C3) are employed in amounts which provide a ratio of moles of component (C3) per mole of component (C1) of from about 0.75:1 to about 1.35:1; and
(e) components (C3a) and (C3b) are employed in a (C3a) to (C3b) of from about 0.3:1 to about 0.7:1.

26. A mixture of claim 24 wherein
(a) component (A) is a glycidyl ether of a polyhydric phenol;
(b) component (B) is a dihydroxy phenol, biphenol, bisphenol, halogenated bisphenol, alkylated bisphenol, trisphenol, phenol-aldehyde resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, or any combination thereof; and
(c) component (C1) is an onium compound of the element phosphorus.

27. A mixture of claim 24 wherein
(a) component (A) is a diglycidyl ether of any of the following: resorcinol, catechol, hydroquinone, biphenol, bisphenol A, bisphenol AP bisphenol F, bisphenol K, tetrabromobisphenol A, phenol-formaldehyde novolac resin, alkyl substituted phenol-formaldehyde resin, phenol-hydroxybenzaldehyde resin, cresol-hydroxybenzaldehyde resin, dicyclopentadiene-phenol resin, dicyclopentadiene-substituted phenol resin tetramethylbiphenol, tetramethyl-tetrabromobiphenol, tetramethyltribromobiphenol, tetrachlorobisphenol A, or any combination thereof;
(b) component (B) is biphenol, bisphenol A, bisphenol K, tetrabromobisphenol A, tetrabromobisphenol K, resorcinol, phenol-aldehyde novolac resins, cresol-aldehyde novolac resins, phenol-hydroxybenzaldehyde resins, cresol-hydroxybenzaldehyde resins, tetramethylbiphenol, tetramethyltribromo-biphenol, tetramethyltetrabromobiphenol, tetrachorobisphenol A, any combination thereof;
(c) component (C1) is ethyltriphenyl phosphonium acetate, ethyltriphenyl phosphonium acetate.acetic acid complex, tetrabutyl phosphonium acetate, tetrabutyl phosphonium acetate.acetic acid complex, ethyltriphenyl phosphonium chloride, ethyl triphenyl phosphonium iodide, tetrabutyl phosphonium chloride, tetrabutyl phosphonium iodide, tetrabutylphosphonium hydroxide, or any combination thereof; and (d) component (C3b) is fluoboric acid.

28. A mixture of claim 24 wherein
(a) component (A) is a glycidyl ether of a polyhydric phenol;
(b) component (B) is a dihydroxy phenol, biphenol, bisphenol, halogenated bisphenol, alkylated bisphenol, trisphenol, phenol-aldehyde resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, or any combination thereof; and (c) component (C1) is a nitrogen containing onium compound.

29. A mixture of claim 24 wherein (a) component (A) is a diglycidyl ether of any of the following: resorcinol, catechol, hydroquinone, biphenol, bisphenol A, bisphenol AP bisphenol F, bisphenol K, tetrabromobisphenol A, phenol-formaldehyde novolac resin, alkyl substituted phenol-formaldehyde resin, phenol-hydroxybenzaldehyde resin, cresol-hydroxybenzaldehyde resin, dicyclopentadiene-phenol resin, dicyclopentadiene-substituted phenol resin tetramethylbiphenol, tetramethyl-tetrabromobiphenol, tetramethyltribromobiphenol, tetrachlorobisphenol A, or any combination thereof;

(b) component (B) is biphenol, bisphenol A, bisphenol K, tetrabromobisphenol A, tetrabromobisphenol K, resorcinol, phenol-aldehyde novolac resins, cresol-aldehyde novolac resins, phenol-hydroxybenzaldehyde resins, cresol-hydroxybenzaldehyde resins, tetramethylbiphenol, tetramethyltribromo-biphenol, tetramethyltetrabromobiphenol, tetrachorobisphenol A, any combination thereof;

(c) component (C1) is tetrabutylammonium hydroxide, tetraethylammonium hydroxide, tetramethylammonium hydroxide, ethyltri(2-ethoxyethyl)ammonium hydroxide, triethyl(2-thioethylethyl)ammonium hydroxide, N-methyl-N-methylenemethanaminium acetate, N-methyl-N-methylenemethanaminium acetate.acetic acid complex, N-methyl-N-methylenemethanaminium chloride, N-methyl-N-methylenemethanaminium iodide, N-methylpyridinium acetate, N-methylpyridinium acetate.acetic acid complex, N-methylpyridinium chloride, N-methylpyridinium iodide, 1-ethyl-2,3-dimethylimidazolium acetate, 1-ethyl-2,3-dimethylimidazolium acetate.acetic acid complex, 1-ethyl-2,3-dimethylimidazolium chloride, 1-ethyl-2,3-dimethylimidazolium iodide, N-methylquinolinium acetate, N-methylquinolinium acetate.acetic acid complex, N-methylquinolinium chloride, N-methylquinolinium iodide, N-methyl-1,3,5-triazinium acetate, N-methyl-1,3,5-triazinium acetate.acetic acid complex, N-methyl-1,3,5-triazinium chloride, N-methyl-1,3,5-triazinium iodide, or any combination thereof; and (d) component (C3b) is fluoboric acid.

30. A mixture of claim 24 wherein (a) component (A) is a glycidyl ether of a polyhydric phenol;

(b) component (B) is a dihydroxy phenol, biphenol, bisphenol, halogenated bisphenol, alkylated bisphenol, trisphenol, phenol-aldehyde resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, or any combination thereof; and (c) component (C1) is a non-heterocyclic amine.

31. A mixture of claim 24 wherein (a) component (A) is a diglycidyl ether of any of the following: resorcinol, catechol, hydroquinone, biphenol, bisphenol A, bisphenol AP bisphenol F, bisphenol K, tetrabromobisphenol A, phenol-formaldehyde novolac resin, alkyl substituted phenol-formaldehyde resin, phenol-hydroxybenzaldehyde resin, cresol-hydroxybenzaldehyde resin, dicyclopentadiene-phenol resin, dicyclopentadiene-substituted phenol resin tetramethylbiphenol, tetramethyl-tetrabromobiphenol, tetramethyltribromobiphenol, tetrachlorobisphenol A, or any combination thereof;

(b) component (B) is biphenol, bisphenol A, bisphenol K, tetrabromobisphenol A, tetrabromobisphenol K, resorcinol, phenol-aldehyde novolac resins, cresol-aldehyde novolac resins, phenol-hydroxybenzaldehyde resins, cresol-hydroxybenzaldehyde resins, tetramethylbiphenol, tetramethyltribromo-biphenol, tetramethyltetrabromobiphenol, tetrachorobisphenol A, any combination thereof;

(c) component (C1) is ethylamine, diethylamine, triethylamine, n-propylamine, di-n-propylamine, tri-n-propylamine, isopropylamine, diisopropylamine, triisopropylamine, butylamine, dibutylamine, tributylamine, methyldibutylamine, or any combination thereof; and (d) component (C3b) is fluoboric acid.

32. A mixture of claim 24 wherein (a) component (A) is a glycidyl ether of a polyhydric phenol;

(b) component (B) is a dihydroxy phenol, biphenol, bisphenol, halogenated bisphenol, alkylated bisphenol, trisphenol, phenol-aldehyde resin, halogenated phenol-aldehyde novolac resin, alkylated phenol-aldehyde novolac resin, phenol-hydroxybenzaldehyde resin, alkylated phenol-hydroxybenzaldehyde resin, hydrocarbon-phenol resin, hydrocarbon-halogenated phenol resin, hydrocarbon-alkylated phenol resin, or any combination thereof;

(c) component (C1) is a heterocyclic amine selected from the group consisting of imidazoles, imidazolidines, imidazolines, oxazoles, pyrroles, thiazoles, pyridines, pyrazines, morpholines, pyridazines, pyrimidines, pyrrolidines, pyrazoles, quinoxalines, quinazolines, phthalozines, quinolines, purines, indazoles, indoles, indolazines, phenazines, phenarsazines, phenothiazines, pyrrolines, indolines, piperidines, piperazines, or any combination thereof; and (d) component (C3b) is fluoboric acid.

33. A mixture of claim 32 wherein component (C) is the catalytic product resulting from contacting an imidazole with boric acid.

34. A mixture of claim 33 wherein said imidazole is 2-methylimidazole.

35. The product resulting from reacting the mixture of claim 23, 24, 25, 26, 27, 28, 29, 30, 31, 32, 33 or 34.

36. A process for coating articles which process comprises (I) applying to the surface of a suitable article, a mixture comprising (A) at least one compound containing an average of more than about 1 vicinal epoxy group per molecule;

(B) at least one compound containing an average of more than about 1 aromatic hydroxyl group per molecule;

(C) the catalytic product resulting from contacting (1) at least one compound selected from the group consisting of
  (a) at least one onium compound of the element nitrogen, phosphorus, sulfur or arsenic;
  (b) at least one amine compound; and
  (c) a mixture of any two or more of the (a) and (b) components; with
(2) boric acid; or with
(3) a mixture of (a) boric acid and (b) at least one acid having a weak nucleophilic anion; and
(D) optionally one or more solvents; and
(II) curing the thus coated article at a suitable temperature to cause the applied mixture to cure;
and wherein
  (i) component (IC) is employed in an amount which provides from about 0.05 mole to about 100 moles of catalytic product per epoxide equivalent contained in component (IA);
  (ii) components (IC1) and (IC2) are employed in amounts which provide a ratio of moles of component (IC2) per mole of component (IC1) of from about 0.6:1 to about 1.4:1;
  (iii) components (IC1) and (IC3) are employed in amounts which provide a ratio of moles of component (IC3) per mole of component (IC1) of from about 0.6:1 to about 1.4:1; and
  (iv) components (IC3a) and (IC3b) are employed in amounts which provides a ratio of moles of component (IC3a) to (IC3b) of from about 0.1:1 to about 0.9:1.

37. A process for preparing "B-staged" reinforcing substrate materials which process comprises
(A) saturating said reinforcing substrate with a curable mixture comprising
  (1) at least one compound containing an average of more than about 1 vicinal epoxy group per molecule;
  (2) at least one compound containing an average of more than about 1 aromatic hydroxyl group per molecule;
  (3) the catalytic product resulting from contacting
    (a) at least one compound selected from the group consisting of
      (i) at least one onium compound of the element nitrogen, phosphorus, sulfur or arsenic;
      (ii) at least one amine compound; and
      (iii) a mixture of any two or more of the (i) and (ii) components; with
    (b) boric acid; or with
    (c) a mixture of
      (i) boric acid and
      (ii) at least one acid having a weak nucleophilic anion; and
  (4) optionally one or more solvents;
(B) optionally removing excess solution from the thus treated reinforcing substrate material by any suitable means;
(C) subjecting the thus treated reinforcing substrate material to a temperature which removes any solvent material which may be present in the mixture applied to said reinforcing substrate material; and
(D) heating the product from step (C) so as to partially cure the thus applied curable mixture thereby forming a "B-staged" reinforcing substrate material; and
wherein (i) component (A3) is employed in an amount which provides from about 0.05 mole to about 100 moles of catalytic product Per epoxide equivalent contained in component (A1);
(ii) components (A3a) and (A3b) are employed in amounts which provide a ratio of moles of component (A3b) per mole of component (A3a) of from about 0.6:1 to about 1.4:1;
(iii) components (A3a) and (A3c) are employed in amounts which provide a ratio of moles of component (A3c) per mole of component (A3a) of from about 0.6:1 to about 1.4:1; and
(iv) components (A3ci) and (A3cii) are employed in amounts which provides a ratio of moles of component (A3ci) to (A3cii) of from about 0.1:1 to about 0.9:1.

38. A process for the preparation of laminates or composites which process comprises
(I) cutting "B-staged" reinforcing substrate material to a desired size and shape; said "B-staged" reinforcing substrate material having been prepared by
  (A) saturating said reinforcing substrate with a curable mixture comprising
    (1) at least one compound containing an average of more than about 1 vicinal epoxy group per molecule;
    (2) at least one compound containing an average of more than about 1 aromatic hydroxyl group per molecule;
    (3) the catalytic product resulting from contacting
      (a) at least one compound selected from the group consisting of (i) at least one onium compound of the element nitrogen, phosphorus, sulfur or arsenic; (ii) at least one amine compound; and (iii) a mixture of any two or more of the (i) and (ii) components; with
      (b) boric acid; or with
      (c) a mixture of (i) boric acid and (ii) at least one acid having a weak nucleophilic anion; and
    (4) optionally one or more solvents;
  (B) optionally removing excess solution from the thus treated reinforcing substrate material by any suitable means;
  (C) subjecting the thus treated reinforcing substrate material to a temperature which removes any solvent material which may be present in the mixture applied to said reinforcing substrate material; and
  (D) heating the product from step (C) so as to partially cure the thus applied curable mixture thereby forming a "B-staged" reinforcing substrate material;
(II) assembling two or more of the resultant cut material together, optionally with either or both of the outside layers or any of the intermediate layers being a material different from said "B-staged" reinforcing substrate material; and
(III) placing the assembled material in a device for applying heat and pressure so as to cure the "B-staged" reinforcing material; and wherein
  (i) component (A3) is employed in an amount which provides from about 0.05 mole to about 100 moles of catalytic product Per epoxide equivalent contained in component (A1);

(ii) components (A3a) and (A3b) are employed in amounts which provide a ratio of moles of component (A3b) per mole of component (A3a) of from about 0.6:1 to about 1.4:1;

(iii) components (A3a) and (A3c) are employed in amounts which provide a ratio of moles of component (A3c) per mole of component (A3a) of from about 0.6:1 to about 1.4:1; and (iv) components (A3ci) and (A3cii) are employed in amounts which provides a ratio of moles of component (A3ci) to (A3cii) of from about 0.1:1 to about 0.9:1.

* * * * *